(12) United States Patent
Nohara

(10) Patent No.: US 12,194,801 B2
(45) Date of Patent: Jan. 14, 2025

(54) ROLL CONTROL SYSTEM AND VEHICLE

(71) Applicant: Robert Bosch GmbH, Stuttgart (DE)

(72) Inventor: Jun Nohara, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/502,810

(22) Filed: Nov. 6, 2023

(65) Prior Publication Data
US 2024/0157753 A1 May 16, 2024

(30) Foreign Application Priority Data
Nov. 11, 2022 (JP) ................ 2022-180702

(51) Int. Cl.
*B60G 21/00* (2006.01)
*B60G 17/016* (2006.01)
*B60G 21/05* (2006.01)

(52) U.S. Cl.
CPC ....... *B60G 21/005* (2013.01); *B60G 17/0162* (2013.01); *B60G 21/05* (2013.01);
(Continued)

(58) Field of Classification Search
CPC .............. B60G 21/005; B60G 17/0162; B60G 2300/07; B60G 2400/204; B60G 2400/41; B60G 2500/10; B60G 2800/012; B60G 2300/45; B60G 2204/82; B60G 2400/0523; B60G 2400/252; B60G 2800/9122; B60G 17/08; B60G 21/05; B60G 2200/132; B60G 2202/20; B60G 3/145; B60G 2400/0511; B60G 2400/104; B62K 5/10
See application file for complete search history.

(56) References Cited

U.S. PATENT DOCUMENTS 1,363,327 A * 12/1920 Larsh ................... B60G 21/005
                                                  280/6.154
3,292,945 A * 12/1966 Dangauthier ............ B60G 3/20
                                              280/124.152

(Continued)

FOREIGN PATENT DOCUMENTS

JP         2022048806 A     3/2022

*Primary Examiner* — Timothy Wilhelm
(74) *Attorney, Agent, or Firm* — Michael Best & Friedrich LLP

(57) ABSTRACT

A roll control system for a vehicle capable of improving the versatility compared to the related art is obtained. A roll control system according to the invention includes: a first component connected to a right connecting device that connects a vehicle body and a right wheel; a second component connected to a left connecting device that connects the vehicle body and a left wheel; and a damper. The damper includes a first damper component and a second damper component reciprocatably connected to each other. The first component includes a first base portion rotatably held by the vehicle body, a first wheel-side arm portion rotatably connected to the right connecting device, and a first damper-side arm portion rotatably connected to the first damper component. The second component includes a second base portion rotatably held by the vehicle body, a second wheel-side arm portion rotatably connected to the left connecting device, and a second damper-side arm portion rotatably connected to the second damper component.

14 Claims, 5 Drawing Sheets

(52) U.S. Cl.
CPC .... *B60G 2200/132* (2013.01); *B60G 2204/82* (2013.01); *B60G 2300/07* (2013.01); *B60G 2300/45* (2013.01); *B60G 2400/0511* (2013.01); *B60G 2400/0523* (2013.01); *B60G 2400/104* (2013.01); *B60G 2400/204* (2013.01); *B60G 2400/252* (2013.01); *B60G 2400/41* (2013.01); *B60G 2500/10* (2013.01); *B60G 2800/012* (2013.01); *B60G 2800/9122* (2013.01)

(56) References Cited

U.S. PATENT DOCUMENTS

| | | | | |
|---|---|---|---|---|
| 3,490,786 | A * | 1/1970 | Ravenel | B60G 17/0277 280/124.101 |
| 3,589,700 | A * | 6/1971 | Ruet | B60G 21/055 267/221 |
| 3,598,385 | A * | 8/1971 | Parsons, Jr. | B60G 21/05 280/124.141 |
| 4,050,710 | A * | 9/1977 | Flaig | B60G 21/0553 280/6.16 |
| 4,534,575 | A * | 8/1985 | Grove | B60G 21/026 180/41 |
| 4,887,829 | A * | 12/1989 | Prince | B60G 21/05 280/282 |
| 5,074,582 | A * | 12/1991 | Parsons | B60G 21/05 267/274 |
| 5,108,126 | A * | 4/1992 | Banse | B60G 15/062 446/466 |
| 5,611,555 | A * | 3/1997 | Vidal | B62D 9/02 280/282 |
| 5,765,846 | A * | 6/1998 | Braun | B60G 21/026 280/124.103 |
| 5,927,424 | A * | 7/1999 | Van Den Brink | B62K 5/027 280/124.103 |
| 6,082,748 | A * | 7/2000 | Hartmann | B60G 15/067 280/124.179 |
| 6,511,078 | B2 * | 1/2003 | Sebe | B60G 7/001 280/5.521 |
| 6,688,619 | B2 * | 2/2004 | Biard | B60G 21/051 301/124.1 |
| 7,090,234 | B2 * | 8/2006 | Takayanagi | B62K 5/10 280/124.112 |
| 7,097,187 | B2 * | 8/2006 | Walters | B62K 5/06 280/124.128 |
| 7,311,167 | B2 * | 12/2007 | Takayanagi | B60G 21/007 180/215 |
| 7,487,985 | B1 * | 2/2009 | Mighell | B62K 5/027 280/124.126 |
| 7,530,419 | B2 * | 5/2009 | Brudeli | B62K 5/027 280/124.109 |
| 7,731,210 | B2 * | 6/2010 | Pedersen | B62K 5/05 180/209 |
| 7,946,596 | B2 * | 5/2011 | Hsu | B62K 5/10 280/5.509 |
| 8,141,890 | B2 * | 3/2012 | Hughes | B62K 5/10 280/5.509 |
| 8,162,328 | B2 * | 4/2012 | Horiguchi | B62K 11/007 280/5.521 |
| 8,286,978 | B2 * | 10/2012 | Marabese | B60G 21/073 280/5.509 |
| 8,376,372 | B2 * | 2/2013 | Kanou | B62K 5/05 280/5.509 |
| 8,485,541 | B2 * | 7/2013 | Pozio | B60G 3/20 280/124.136 |
| 9,199,686 | B2 * | 12/2015 | Aillet | B60G 21/007 |
| 9,211,773 | B2 * | 12/2015 | Kitamura | B62K 5/05 |
| 9,381,940 | B2 * | 7/2016 | Gale | B60G 21/073 |
| 9,708,005 | B2 * | 7/2017 | Reusser | B60G 21/007 |
| 9,775,756 | B2 * | 10/2017 | Gordon | B60G 21/05 |
| 9,873,304 | B2 * | 1/2018 | Tabata | B60G 21/073 |
| 10,023,019 | B2 * | 7/2018 | Spahl | B60G 21/05 |
| 10,076,939 | B2 * | 9/2018 | Simon | B60G 21/055 |
| 10,144,475 | B2 * | 12/2018 | Matthies | B60G 21/007 |
| 10,507,882 | B2 * | 12/2019 | Wei | B62K 7/04 |
| 10,668,972 | B2 * | 6/2020 | Hara | B62K 23/02 |
| 10,717,333 | B2 * | 7/2020 | Mori | B60G 3/207 |
| 11,001,328 | B2 * | 5/2021 | Hu | B62K 5/027 |
| 11,292,517 | B2 * | 4/2022 | Yu | B60G 17/0162 |
| 11,319,015 | B2 * | 5/2022 | Iwamoto | B62K 25/16 |
| 11,364,764 | B2 * | 6/2022 | Dekel | B60G 21/045 |
| 11,400,998 | B2 * | 8/2022 | Iwamoto | B60G 3/14 |
| 11,685,208 | B2 * | 6/2023 | Sardes | B62D 21/11 280/124.109 |
| 11,807,064 | B2 * | 11/2023 | Edberg | B60G 11/16 |
| 11,878,763 | B2 * | 1/2024 | Calderon | B60G 3/20 |
| 11,970,240 | B2 * | 4/2024 | Du | B60G 13/003 |
| 2008/0001377 | A1 * | 1/2008 | Rogic | B60G 21/007 280/124.125 |
| 2014/0312580 | A1 * | 10/2014 | Gale | B62D 9/02 280/5.509 |
| 2019/0084638 | A1 * | 3/2019 | Melcher | B62L 1/005 |
| 2019/0135340 | A1 * | 5/2019 | Mainville | B60G 3/20 |
| 2021/0229774 | A1 * | 7/2021 | Barenbrug | B62J 43/13 |

\* cited by examiner

ROLL CONTROL SYSTEM AND VEHICLE

BACKGROUND OF THE INVENTION

The present invention relates to a roll control system that controls a roll behavior of a vehicle, and a vehicle including the roll control system.

In the related art, there is a vehicle including right and left wheels in which a roll control system that connects the right and left wheels using one bar member is provided as a roll control system that controls the roll behavior of the vehicle (for example, refer to JP2022-048806A). The one bar member connecting the right and left wheels is also referred to as a stabilizer bar. One end of the stabilizer bar is connected to a right connecting device such as a suspension that connects a vehicle body and the right wheel. In addition, the other end of the stabilizer bar is connected to a left connecting device such as a suspension that connects the vehicle body and the left wheel. In the vehicle to which the roll control system of the related art including the stabilizer bar is mounted, the stabilizer bar restricts the independent up and down movements of the right wheel and the left wheel. For this reason, in the vehicle to which the roll control system of the related art including the stabilizer bar is mounted, when, for example, the vehicle travels on a flat road surface at high speed, the behavior of the vehicle body is stabilized.

SUMMARY OF THE INVENTION

As described above, in the vehicle to which the roll control system of the related art including the stabilizer bar is mounted, when the vehicle travels on a flat road surface at high speed, for example, the behavior of the vehicle body is stabilized. On the other hand, in the vehicle to which the roll control system of the related art including the stabilizer bar is mounted, when the vehicle travels on a road surface with large unevenness or the like, it is difficult for the right wheel and the left wheel to move up and down while following the road surface due to the stabilizer bar. For this reason, in the vehicle to which the roll control system of the related art including the stabilizer bar is mounted, when the vehicle travels on a road surface with large unevenness or the like, the behavior of the vehicle body may become unstable. In such a manner, the roll control system of the related art that connects the right and left wheels requires an improvement in versatility, which is a problem.

The invention has been made in view of the above-described problem, and a first object of the invention is to obtain a roll control system that controls the roll behavior of a vehicle and that can improve versatility compared to the related art. In addition, a second object of the invention is to obtain a vehicle including such a roll control system.

According to one aspect of the invention, there is provided a roll control system that controls a roll behavior of a vehicle including right and left wheels, the system including: a first component connected to a right connecting device that connects a vehicle body of the vehicle and a right wheel; a second component connected to a left connecting device that connects the vehicle body and a left wheel; and a damper connected to the first component and the second component. The damper includes a first damper component and a second damper component reciprocatably connected to the first damper component. The first component includes a first base portion rotatably held by the vehicle body, a first wheel-side arm portion extending from the first base portion and rotatably connected to the right connecting device, and a first damper-side arm portion extending from the first base portion and rotatably connected to the first damper component. The second component includes a second base portion rotatably held by the vehicle body, a second wheel-side arm portion extending from the second base portion and rotatably connected to the left connecting device, and a second damper-side arm portion extending from the second base portion and rotatably connected to the second damper component.

In addition, according to one aspect of the invention, there is provided a vehicle including: the roll control system according to the invention.

The roll control system according to the invention can become a roll control system with improved versatility compared to the related art, by changing the characteristics of the damper connected to the first component and the second component.

DETAILED DESCRIPTION OF THE INVENTION

Hereinafter, one example of a roll control system and a vehicle according to the invention will be described with reference to the drawings.

Incidentally, hereinafter, a four-wheeled motor vehicle will be described as one example of the vehicle in which the invention is adopted; however, the vehicle in which the invention is adopted is not limited in terms of the number of wheels as long as the vehicle includes right and left wheels. The vehicle in which the invention is adopted may be, for example, a three-wheeled motor vehicle. In addition, hereinafter, an off-road vehicle (vehicle that travels on a road surface other than a paved road) will be described as one example of the vehicle in which the invention is adopted; however, the vehicle in which the invention is adopted may be an on-road vehicle (vehicle that travels on a paved road). In addition, hereinafter, a drive source of the vehicle in which the invention is adopted is not particularly limited, and the vehicle may use at least one of an engine and an electric motor as a drive source, and may be a bicycle including right and left wheels. Incidentally, the bicycle generally refers to conveyances that can be propelled on a road by pedal force applied to pedals. Namely, examples of the bicycle include a regular bicycle, an electrically assisted bicycle, an electric bicycle, and the like.

In addition, configurations, operations, and the like to be described below are provided as one example, and the invention is not limited to such configurations, operations, and the like. In addition, in each drawing, the same or similar members or portions may be denoted by the same reference signs or may not be denoted by the reference signs. In addition, the illustration of detailed structures is simplified or omitted as appropriate.

Hereinafter, a roll control system and a vehicle according to a first embodiment will be described with reference to the drawings.

<Vehicle to Which Roll Control System is Mounted and Configuration of Roll Control System>

Figure 1:
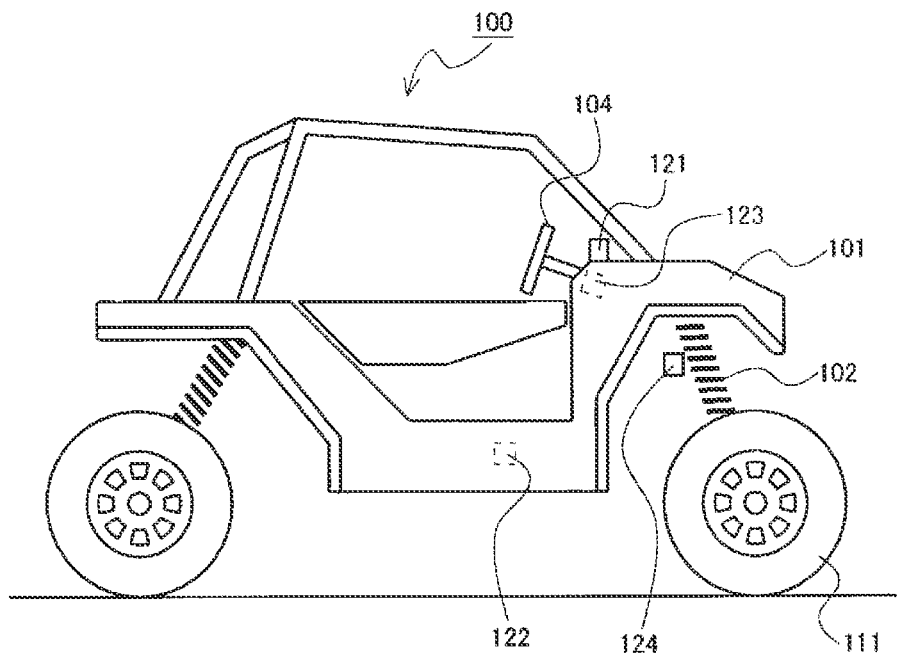
FIG. 1 is a view of a vehicle to which a roll control system according to a first embodiment of the invention is mounted, when observed from the right side.
Figure 2:
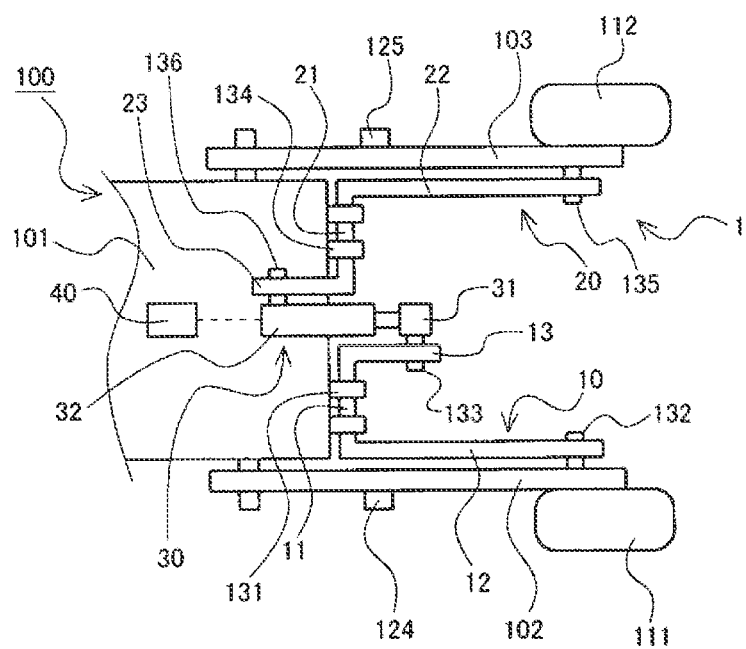
FIG. 2 is a view showing a state where the roll control system according to the first embodiment of the invention is mounted to the vehicle, when observed in the line of sight from above the vehicle.
Figure 3:
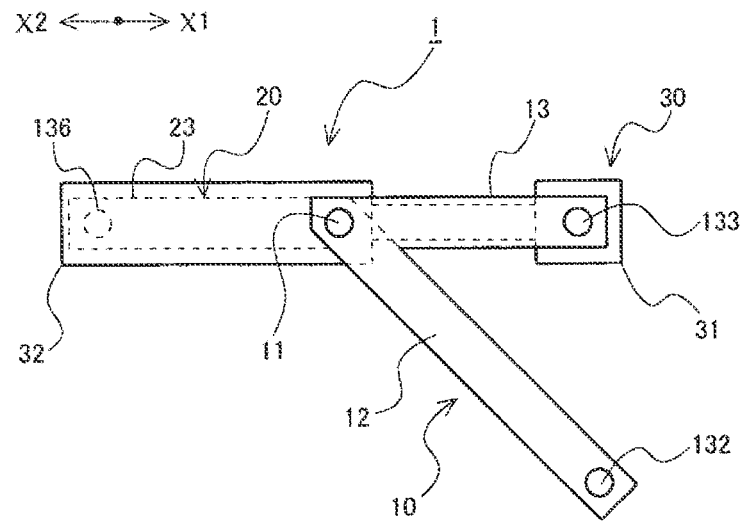
FIG. 3 is a view showing the roll control system according to the first embodiment of the invention, and is a view showing a state where the roll control system is mounted to the vehicle, when observed in the line of sight from the right side of the vehicle.
Figure 4:
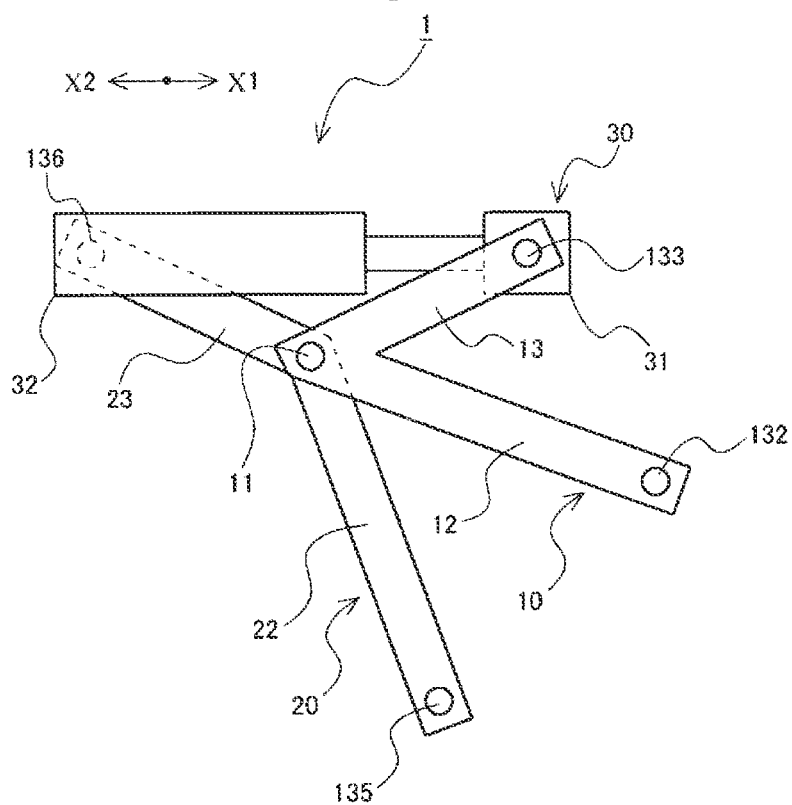
FIG. 4 is a view showing the roll control system according to the first embodiment of the invention, and is a view showing a state where the roll control system is mounted to the vehicle, when observed in the line of sight from the right side of the vehicle.

FIG. 1 is a view of a vehicle to which the roll control system according to the first embodiment of the invention is mounted, when observed from the right side. FIG. 2 is a view showing a state where the roll control system according to the first embodiment of the invention is mounted to the vehicle, when observed in the line of sight from above the vehicle. Incidentally, in FIGS. 1 and 2, the right side of the drawing sheets is a front side of a vehicle 100. In addition, FIGS. 3 and 4 are views showing the roll control system according to the first embodiment of the invention, and are views showing a state where the roll control system is mounted to the vehicle, when observed in the line of sight from the right side of the vehicle. In other words, FIGS. 3 and 4 are views of a roll control system 1 according to the first embodiment when observed from the lower side of the drawing sheet of FIG. 2. Incidentally, FIG. 3 shows the roll control system 1 in a state where the vehicle 100 is not rolling. In addition, FIG. 4 shows the roll control system 1 in a state where the vehicle 100 is rolling to the right side.

For example, the vehicle 100 that is an off-road vehicle includes a vehicle body 101. In addition, the vehicle 100 includes four wheels. Specifically, the vehicle 100 includes a right front wheel, a left front wheel, a right rear wheel, and a left rear wheel. Hereinafter, the right front wheel is referred to as a right wheel 111. In addition, the left front wheel is referred to as a left wheel 112. Each of the four wheels is connected to the vehicle body 101 by a connecting device such as a suspension. Hereinafter, the connecting device that connects the vehicle body 101 and the right wheel 111 is referred to as a right connecting device 102. In addition, the connecting device that connects the vehicle body 101 and the left wheel 112 is referred to as a left connecting device 103.

The roll control system 1 that controls the roll behavior of the vehicle 100 is mounted to the vehicle 100. In other words, the vehicle 100 includes the roll control system 1. The roll control system 1 is connected to the right wheel 111 and the left wheel 112. Specifically, the roll control system 1 is connected to the right wheel 111 via the right connecting device 102, and is connected to the left wheel 112 via the left connecting device 103. Incidentally, the roll control system 1 may be connected to the right rear wheel and the left rear wheel. In addition, the vehicle 100 may include both the roll control system 1 connected to the right wheel 111 and the left wheel 112 and the roll control system 1 connected to the right rear wheel and the left rear wheel.

The roll control system 1 includes a first component 10 connected to the right connecting device 102; a second component 20 connected to the left connecting device 103; and a damper 30 connected to the first component 10 and the second component 20.

The damper 30 includes a component including a cylinder portion filled with a fluid; and a component including a piston that reciprocates in the cylinder portion and a rod connected to the piston. Among these components, the component connected to the first component 10 is referred to as a first damper component 31. In addition, among these components, the component connected to the second component 20 is referred to as a second damper component 32. Namely, the damper 30 includes the first damper component 31 and the second damper component 32 reciprocatably connected to the first damper component 31.

The first component 10 includes a first base portion 11, a first wheel-side arm portion 12, and a first damper-side arm portion 13. The first base portion 11 is rotatably held by the vehicle body 101 of the vehicle 100. In the first embodiment, the first base portion 11 is rotatably held by a holding portion 131 provided to the vehicle body 101. The first wheel-side arm portion 12 extends from the first base portion 11, and is rotatably connected to the right connecting device 102. For example, the first wheel-side arm portion 12 is rotatably connected to a suspension arm that is a component of the suspension that connects the vehicle body 101 and the right wheel 111. In the first embodiment, the first wheel-side arm portion 12 is rotatably connected to the right connecting device 102 by a connecting portion 132. The first damper-side arm portion 13 extends from the first base portion 11, and is rotatably connected to the first damper component 31. In the first embodiment, the first damper-side arm portion 13 is rotatably connected to the first damper component 31 by a connecting portion 133.

The second component 20 includes a second base portion 21, a second wheel-side arm portion 22, and a second damper-side arm portion 23.

The second base portion 21 is rotatably held by the vehicle body 101 of the vehicle 100. In the first embodiment, the second base portion 21 is rotatably held by a holding portion 134 provided to the vehicle body 101. Here, in the first embodiment, when the roll control system 1 mounted to the vehicle 100 is observed in the line of sight from the side of the vehicle 100, the second base portion 21 is at the same position as the first base portion 11 of the first component 10. For this reason, in FIGS. 3 and 4, the second base portion 21 and the first base portion 11 overlap each other, and only the first base portion 11 is shown. Therefore, when referring to FIGS. 3 and 4, it is desirable to recognize that the position of the second base portion 21 is the same as the position of the first base portion 11. Incidentally, when the roll control system 1 mounted to the vehicle 100 is observed in the line of sight from the side of the vehicle 100, it is preferable that the second base portion 21 is at the same position as the first base portion 11; however, the second base portion 21 may be disposed at a position different from that of the first base portion 11.

The second wheel-side arm portion 22 extends from the second base portion 21, and is rotatably connected to the left connecting device 103. For example, the second wheel-side arm portion 22 is rotatably connected to a suspension arm that is a component of the suspension that connects the vehicle body 101 and the left wheel 112. In the first embodiment, the second wheel-side arm portion 22 is rotatably connected to the left connecting device 103 by a connecting portion 135.

Here, in the first embodiment, when the roll control system 1 mounted to the vehicle 100 is observed in the line of sight from the side of the vehicle 100, in a state where the vehicle 100 is not rolling, the second wheel-side arm portion 22 overlaps the first wheel-side arm portion 12 of the first component 10. For this reason, in FIG. 3, the second wheel-side arm portion 22 and the first wheel-side arm portion 12 overlap each other, and only the first wheel-side arm portion 12 is shown. Therefore, when referring to FIG. 3, it is desirable to recognize that the position of the second wheel-side arm portion 22 is the same as the position of the first wheel-side arm portion 12. Similarly, in the first embodiment, when the roll control system 1 mounted to the vehicle 100 is observed in the line of sight from the side of the vehicle 100, in a state where the vehicle 100 is not rolling, the position of the connecting portion 135 is the same as the position of the connecting portion 132. For this reason, in FIG. 3, the connecting portion 135 and the connecting portion 132 overlap each other, and only the connecting portion 132 is shown. Therefore, when referring to FIG. 3, it is desirable to recognize that the position of the connecting portion 135 is the same as the position of the connecting portion 132. Incidentally, when the roll control system 1 mounted to the vehicle 100 is observed in the line of sight from the side of the vehicle 100, in a state where the vehicle 100 is not rolling, it is preferable that the connecting portion 135 is at the same position as the connecting portion 132; however, the connecting portion 135 may be disposed at a position different from that of the connecting portion 132.

The second damper-side arm portion 23 extends from the second base portion 21, and is rotatably connected to the second damper component 32. In the first embodiment, the second damper-side arm portion 23 is rotatably connected to the second damper component 32 by a connecting portion 136.

When the vehicle 100 rolls, the roll control system 1 configured in such a manner operates as follows when observed in the line of sight from the side of the vehicle 100.

First, in a state where the vehicle 100 is not rolling, as shown in FIG. 3, the first damper-side arm portion 13 of the first component 10 and the second damper-side arm portion 23 of the second component 20 extend in substantially opposite directions with respect to the first base portion 11 and the second base portion 21. Then, the first damper-side arm portion 13 and the second damper-side arm portion 23 are disposed to overlap the damper 30.

When the vehicle 100 rolls to the right side, the right wheel 111 approaches the vehicle body 101. Namely, the connecting portion 132 that connects the first wheel-side arm portion 12 of the first component 10 and the right connecting device 102 also approaches the vehicle body 101. Accordingly, the first component 10 rotates about the first base portion 11 as the center of rotation, and changes from the state shown in FIG. 3 to the state shown in FIG. 4. Specifically, the first wheel-side arm portion 12 of the first component 10 rotates about the first base portion 11 as the center of rotation in a direction in which the connecting portion 132 approaches the vehicle body 101 (upward direction in FIG. 4). In addition, the first damper-side arm portion 13 of the first component 10 rotates about the first base portion 11 as the center of rotation in a direction in which the connecting portion 133 that connects the first damper-side arm portion 13 and the first damper component 31 approaches the second damper component 32.

On the other hand, when the vehicle 100 rolls to the right side, the left wheel 112 moves away from the vehicle body 101. Namely, the connecting portion 135 that connects the second wheel-side arm portion 22 of the second component 20 and the left connecting device 103 also moves away from the vehicle body 101. Accordingly, the second component 20 rotates about the second base portion 21 as the center of rotation, and changes from the state shown in FIG. 3 to the state shown in FIG. 4. Specifically, the second wheel-side arm portion 22 of the second component 20 rotates about the second base portion 21 as the center of rotation in a direction in which the connecting portion 135 moves away from the vehicle body 101 (downward direction in FIG. 4). In addition, the second damper-side arm portion 23 of the second component 20 rotates about the second base portion 21 as the center of rotation in a direction in which the connecting portion 136 that connects the second damper-side arm portion 23 and the second damper component 32 approaches the first damper component 31.

Namely, in the roll control system 1 configured in such a manner, the damper 30 is configured to contract as the roll angle of the vehicle 100 to the right side increases. In addition, in the roll control system 1 configured in such a manner, the damper 30 is configured to extend as the roll angle of the vehicle 100 to the right side decreases. Then, in the roll control system 1 configured in such a manner, when the vehicle 100 is not rolling, the damper 30 is in a maximum extended state. Incidentally, when the vehicle 100 rolls to the left side, the damper 30 also moves similarly.

Specifically, when the vehicle 100 rolls to the left side, the right wheel 111 moves away from the vehicle body 101. Namely, the connecting portion 132 that connects the first wheel-side arm portion 12 of the first component 10 and the right connecting device 102 also moves away from the vehicle body 101. Accordingly, the first wheel-side arm portion 12 of the first component 10 rotates about the first base portion 11 as the center of rotation in a direction in which the connecting portion 132 moves away from the vehicle body 101. In addition, the first damper-side arm portion 13 of the first component 10 rotates about the first base portion 11 as the center of rotation in a direction in which the connecting portion 133 that connects the first damper-side arm portion 13 and the first damper component 31 approaches the second damper component 32.

On the other hand, when the vehicle 100 rolls to the left side, the left wheel 112 approaches the vehicle body 101. Namely, the connecting portion 135 that connects the second wheel-side arm portion 22 of the second component 20 and the left connecting device 103 also approaches the vehicle body 101. Accordingly, the second wheel-side arm portion 22 of the second component 20 rotates about the second base portion 21 as the center of rotation in a direction in which the connecting portion 135 approaches the vehicle body 101. In addition, the second damper-side arm portion 23 of the second component 20 rotates about the second base portion 21 as the center of rotation in a direction in which the connecting portion 136 that connects the second damper-side arm portion 23 and the second damper component 32 approaches the first damper component 31.

In such a manner, in the roll control system 1 according to the first embodiment, the damper 30 is configured to contract as the roll angle of the vehicle 100 to the left side increases. In addition, in the roll control system 1 configured in such a manner, the damper 30 is configured to extend as the roll angle of the vehicle 100 to the left side decreases. Namely, in the roll control system 1 according to the first embodiment, the damper 30 is configured to contract as the roll angle of the vehicle 100 increases. Hereinafter, a direction in which the second damper component 32 moves relative to the first damper component 31 when the roll angle of the vehicle 100 increases is referred to as a first direction X1. In addition, a direction opposite to the first direction X1 is referred to as a second direction X2. Namely, the first direction X1 is a direction in which the second damper component 32 moves relative to the first damper component 31 when the vehicle 100 rolls. In addition, the second direction X2 is a direction in which the second damper component 32 moves relative to the first damper component 31 when the vehicle body 101 of the vehicle 100 in rolling returns to a horizontal state.

The roll control system 1 configured in such a manner can become a roll control system with improved versatility compared to the related art, by changing the characteristics of the damper 30. The characteristics of the damper 30 are the damping force and the like of the damper 30. In the first embodiment, the roll control system 1 includes a control device 40, and the control device 40 changes the characteristics of the damper 30. The control device 40 may include, for example, a microcomputer, a microprocessor unit, or the like, may include updatable firmware or the like, and may include a program module or the like to be executed by commands from a CPU or the like.

Incidentally, a known damper with variable damping force can be used as the damper 30. For example, there is a damper in which a flow path through which a fluid with which a cylinder portion is filled flows when a piston moves in the cylinder portion is provided with a valve that changes the opening degree of the flow path. Examples of such a damper include a damper in which the opening degree of the flow path is changed by the valve when the damper contracts, a damper in which the opening degree of the flow path is changed by the valve when the damper extends, and a damper in which the opening degree of the flow path is changed by the valve both when the damper contracts and when the damper extends. In addition, in such a damper, when the opening degree of the flow path is changed by the valve, only the opening and closing of the flow path can be changed, the opening degree of the flow path in an open state can be changed, or both can be changed. In addition, in such a damper, in a case where the flow path is in a closed state when the damper attempts to contract, the fluid cannot flow through the flow path, and the damper contracts only by the amount that the fluid is compressed by pressure from the piston. Namely, substantially, the damper does not contract. In addition, in such a damper, in a case where the flow path is in a closed state when the damper attempts to extend, the fluid cannot flow through the flow path, and the damper extends only by the amount that the fluid is compressed by pressure from the piston. Namely, substantially, the damper does not extend. In addition, in such a damper, in a case where the flow path is in a closed state both when the damper attempts to extend and when the damper is about to contract, the damper extends and contracts only by the amount that the fluid is compressed by pressure from the piston. Namely, substantially, the damper does not extend and contract. Any of such dampers can be used as the damper 30. A damper capable of implementing a change in the characteristics of the damper 30 to be executed by the control device 40 may be adopted as the damper 30 as appropriate.

In the first embodiment, the control device 40 changes the characteristics of the damper 30 as follows. The control device 40 switches between a first damper state and a second damper state. The first damper state is a state where the movement of the second damper component 32 with respect to the first damper component 31 in the first direction X1 is in a first state. The second damper state is a state where the movement of the second damper component 32 with respect to the first damper component 31 in the first direction X1 is in a second state different from the first state.

For example, the control device 40 changes the damping force of the damper 30 between the first damper state and the second damper state. In other words, the control device 40 changes the damping force of the damper 30 between the first state and the second state.

When the roll angle of the vehicle 100 increases, namely, when the vehicle 100 rolls, the second damper component 32 moves in the first direction X1 with respect to the first damper component 31. At this time, the smaller the damping force of the damper 30 becomes, the smaller the resistance generated when the second damper component 32 moves with respect to the first damper component 31 becomes. For this reason, the smaller the damping force of the damper 30 becomes, the less likely the rotational force generated when one of the first component 10 and the second component 20 rotates is to be transmitted to the other of the first component 10 and the second component 20. Therefore, the smaller the damping force of the damper 30 becomes, when one of the right wheel 111 and the left wheel 112 moves up and down the less likely the roll control system 1 is to restrict the up and down movement of the other of the right wheel 111 and the left wheel 112. Namely, the smaller the damping force of the damper 30 becomes, the more closely the right wheel 111 and the left wheel 112 can perform operations of right and left wheels of a vehicle of the related art that does not include a stabilizer bar.

On the other hand, the larger the damping force of the damper 30 becomes, the larger the resistance generated when the second damper component 32 moves with respect to the first damper component 31 becomes. For this reason, the larger the damping force of the damper 30 becomes, the more easily the rotational force generated when one of the first component 10 and the second component 20 rotates is transmitted to the other of the first component 10 and the second component 20. Therefore, the larger the damping force of the damper 30 becomes, the more greatly the roll control system 1 restricts the up and down movements of the right wheel 111 and the left wheel 112, which are independent of each other. Namely, the larger the damping force of the damper 30 becomes, the more the roll behavior of the vehicle 100 is suppressed.

In such a manner, the control device 40 can set the roll behavior characteristic of the vehicle 100 to a plurality of behavior characteristics by changing the damping force of the damper 30 between the first damper state and the second damper state. Therefore, the roll control system 1 can become a roll control system with improved versatility compared to the related art, by changing the characteristics of the damper 30. Incidentally, the damping force of the damper 30 in the first damper state does not need to be fixed at one value, and the damping force of the damper 30 in the second damper state also does not need to be fixed at one value. The control device 40 may change the damping force of the damper 30 to a plurality of values in at least one of the first damper state and the second damper state. Accordingly, the roll behavior characteristic of the vehicle 100 can be set to a larger number of behavior characteristics, and the versatility of the roll control system 1 can be further improved.

In addition, when the control device 40 switches the state of the damper 30 between the first damper state and the second damper state, the control device 40 may bring the damper 30 into the following state in the first damper state or the second damper state. In the first damper state or the second damper state, the control device 40 may set a flow path inside the damper 30 to a closed state when the second damper component 32 attempts to move in the first direction X1 with respect to the first damper component 31, the fluid flowing through the flow path. By setting the flow path to a closed state, the damper 30 is allowed to contract only by the amount that the fluid is compressed by pressure from the piston. For this reason, the control device 40 can cause the roll control system 1 to function similar to the stabilizer bar of the related art by setting the state of the damper 30 in the first damper state or the second damper state in such a manner.

Here, in the first embodiment, the control device 40 is configured to switch between the first damper state and the second damper state as follows. In other words, the control device 40 is configured to switch between the first state and the second state as follows.

Figure 5:
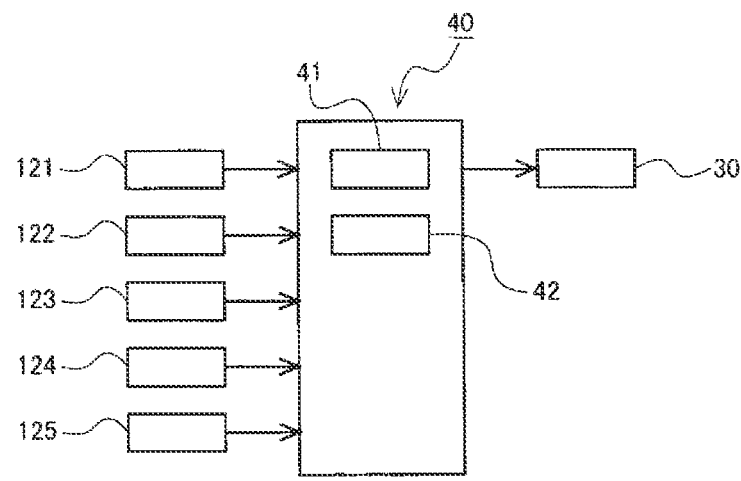
FIG. 5 is a block diagram showing a control device for the roll control system according to the first embodiment of the invention.

FIG. 5 is a block diagram showing the control device for the roll control system according to the first embodiment of the invention.

The control device 40 includes an acquisition unit 41 and a control unit 42 as functional units. The acquisition unit 41 is a functional unit that acquires information serving as determination criteria for switching between the first state and the second state. The control unit 42 is a functional unit that switches between the first state and the second state according to the information acquired by the acquisition unit 41.

For example, the acquisition unit 41 acquires vehicle speed information of the vehicle 100. In the first embodiment, as shown in FIG. 1, the vehicle 100 includes a speedometer 121. For this reason, in the first embodiment, as shown in FIG. 5, the acquisition unit 41 acquires a vehicle speed of the vehicle 100 from the speedometer 121 as the vehicle speed information of the vehicle 100. Then, the control unit 42 switches between the first state and the second state according to the value of the vehicle speed information acquired by the acquisition unit 41. For example, the control unit 42 switches between the first state and the second state depending on whether the vehicle speed of the vehicle 100 is a default value or more.

For example, when the off-road vehicle travels on a road surface with large unevenness or the like at low speed, the behavior of the vehicle body is more stabilized when the right and left wheels can move up and down independently. However, even when such an off-road vehicle travels on a flat road surface at high speed, the behavior of the vehicle body is more stabilized when the independent up and down movements of the right and left wheels are restricted to suppress the roll behavior. In such a manner, in the vehicle 100, the preferred degree of restriction to the independent up and down movements of the right wheel 111 and the left wheel 112 may differ depending on the vehicle speed of the vehicle 100. In such a case, the safety of the vehicle 100 is improved by performing switching between the first state and the second state according to the vehicle speed information of the vehicle 100.

Incidentally, the vehicle speed information of the vehicle 100 is not limited to the vehicle speed of the vehicle 100. The vehicle speed information of the vehicle 100 may be, for example, another physical quantity that can be converted into the vehicle speed of the vehicle 100. In addition, the acquisition source of the vehicle speed information of the vehicle 100 is not limited to the speedometer 121. For example, the acquisition unit 41 may acquire the vehicle speed information of the vehicle 100 from a configuration other than the speedometer 121, such as a wheel speed sensor that detects a rotation speed of the wheel of the vehicle 100.

In addition, for example, the acquisition unit 41 acquires roll information of the vehicle 100. In the first embodiment, as shown in FIG. 1, the vehicle 100 includes an inertia measurement device 122. For this reason, in the first embodiment, as shown in FIG. 5, the acquisition unit 41 acquires an acceleration or yaw rate of the vehicle 100 in a lateral direction from the inertia measurement device 122 as the roll information of the vehicle 100. Then, the control unit 42 switches between the first state and the second state according to the value of the roll information acquired by the acquisition unit 41. For example, the control unit 42 switches between the first state and the second state depending on whether the acceleration or yaw rate of the vehicle 100 in the lateral direction is a default value or more.

For example, when the vehicle 100 is about to roll rapidly, the behavior of the vehicle body is more stabilized when the independent up and down movements of the right wheel 111 and the left wheel 112 are restricted to suppress the roll behavior. In such a case, the safety of the vehicle 100 is improved by performing switching between the first state and the second state according to the roll information of the vehicle 100.

Incidentally, the roll information of the vehicle 100 is not limited to the acceleration or yaw rate of the vehicle 100 in the lateral direction. The roll information of the vehicle 100 may be, for example, a physical quantity other than the acceleration or yaw rate of the vehicle 100 in the lateral direction as long as the roll behavior of the vehicle 100 can be identified by the physical quantity. In addition, the acquisition source of the roll information of the vehicle 100 is not limited to the inertia measurement device 122. For example, the acquisition unit 41 may acquire the roll information of the vehicle 100 from a configuration other than the inertia measurement device 122.

In addition, for example, the acquisition unit 41 acquires steering angle information of the vehicle 100. In the first embodiment, as shown in FIG. 1, the vehicle 100 includes a steering angle detection sensor 123 that detects a steering angle of a steering wheel 104. For this reason, in the first embodiment, as shown in FIG. 5, the acquisition unit 41 acquires a steering angle of the steering wheel 104 from the steering angle detection sensor 123 as the steering angle information of the vehicle 100. Then, the control unit 42 switches between the first state and the second state according to the value of the steering angle information acquired by the acquisition unit 41. For example, the control unit 42 switches between the first state and the second state depending on whether the steering angle of the steering wheel 104 is a default value or more.

For example, the larger the steering angle of the vehicle 100 is, and then, the more easily the vehicle 100 rolls. For this reason, when the steering angle of the vehicle 100 is large, the behavior of the vehicle body is more stabilized when the independent up and down movements of the right wheel 111 and the left wheel 112 are restricted to suppress the roll behavior. By performing switching between the first state and the second state according to the steering angle information of the vehicle 100, the roll behavior of the vehicle 100 can be suppressed before the roll angle of the vehicle 100 increases, so that the safety of the vehicle 100 is improved.

Incidentally, the steering angle information of the vehicle 100 is not limited to the steering angle of the steering wheel 104. The steering angle information of the vehicle 100 may be, for example, another physical quantity that can be converted into the steering angle of the vehicle 100. In addition, the acquisition source of the steering angle information of the vehicle 100 is not limited to the steering angle detection sensor 123. For example, the acquisition unit 41 may acquire the steering angle information of the vehicle 100 from a configuration other than the steering angle detection sensor 123.

In addition, for example, the control device 40 may switch between the first state and the second state according to a distance between the vehicle body 101 and the right wheel 111 and a distance between the vehicle body 101 and the left wheel 112. In the first embodiment, as shown in FIGS. 1 and 2, the vehicle 100 includes a stroke sensor 124 that detects the distance between the vehicle body 101 and the right wheel 111, and a stroke sensor 125 that detects the distance between the vehicle body 101 and the left wheel 112. Then, the acquisition unit 41 of the control device 40 acquires the distance between the vehicle body 101 and the right wheel 111 from the stroke sensor 124, and acquires the distance between the vehicle body 101 and the left wheel 112 from the stroke sensor 125. Then, the control unit 42 of the control device 40 switches between the first state and the second state according to the distance between the vehicle body 101 and the right wheel 111 and the distance between the vehicle body 101 and the left wheel 112. Specifically, the distance between the vehicle body 101 and the right wheel 111 is referred to as a first distance, and the distance between the vehicle body 101 and the left wheel 112 is referred to as a second distance. For example, the control unit 42 switches between the first state and the second state depending on whether the absolute value of a difference between the first distance and the second distance is a default value or more.

When the absolute value of the difference between the first distance and the second distance is the default value or more, it is considered that the vehicle 100 travels on a road surface with large unevenness. In such a case, the behavior of the vehicle 100 is more stabilized when the right wheel 111 and the left wheel 112 can move up and down as independently as possible. For this reason, the safety of the vehicle 100 is improved by performing switching between the first state and the second state according to the distance between the vehicle body 101 and the right wheel 111 and the distance between the vehicle body 101 and the left wheel 112. Incidentally, the distance between the vehicle body 101 and the right wheel 111 may be acquired from a configuration other than the stroke sensor 124, and the distance between the vehicle body 101 and the left wheel 112 may be acquired from a configuration other than the stroke sensor 125.

Here, when switching is performed between the first damper state and the second damper state, the movement of the second damper component 32 with respect to the first damper component 31 in the second direction X2 may be unchanged between the first damper state and the second damper state. Specifically, the damping force or the like of the damper 30 when the second damper component 32 moves in the second direction X2 with respect to the first damper component 31 may be unchanged between the first damper state and the second damper state. Namely, the damping force or the like of the damper 30 when the vehicle body 101 of the vehicle 100 in rolling returns to a horizontal state may be unchanged between the first damper state and the second damper state. Incidentally, "being unchanged" referred to in the first embodiment may not refer to strictly being unchanged, but may refer to substantially being unchanged. Namely, "being unchanged" referred to in the first embodiment is an expression that permits a slight change.

As described above, the larger the damping force of the damper 30 becomes, the more the independent up and down movements of the right wheel 111 and the left wheel 112 are restricted. Namely, the larger the damping force of the damper 30 becomes, the higher the rigidity of the roll control system 1 becomes. Here, in order to suppress the roll behavior when the vehicle 100 rolls, it is preferable that the rigidity of the roll control system 1 is high. On the other hand, in a case where the rigidity of the roll control system 1 is too high, when the vehicle body 101 of the vehicle 100 in rolling returns to a horizontal state, due to the reaction force of the roll control system 1, the acceleration of the vehicle 100 in a direction in which the vehicle body 101 returns to a horizontal state may become too large, and the behavior of the vehicle 100 may become unstable. However, by making the movement of the second damper component 32 with respect to the first damper component 31 in the second direction X2 unchanged between the first damper state and the second damper state, even when the damping force or the like of the damper 30 when the vehicle 100 rolls is changed, an excessive increase in the damping force of the damper 30 when the vehicle body 101 of the vehicle 100 in rolling returns to a horizontal state can be suppressed. For this reason, even when the damping force or the like of the damper 30 when the vehicle 100 rolls is changed, an unstable behavior of the vehicle 100 when the vehicle body 101 of the vehicle 100 in rolling returns to a horizontal state can be suppressed.

In addition, when the control device 40 switches between the first damper state and the second damper state, the control device 40 may change the position of the second damper component 32 with respect to the first damper component 31 in at least one of an initial state and a final state of the movement of the second damper component 32 with respect to the first damper component 31 in the first direction X1 in the first damper state and the second damper state.

For example, it is assumed that in the first damper state and the second damper state, the position of the second damper component 32 with respect to the first damper component 31 is changed in the initial state of the movement of the second damper component 32 with respect to the first damper component 31 in the first direction X1. In this case, when the vehicle 100 in rolling returns from a rolling state, the inclination of the vehicle body 101 in the lateral direction differs between the first damper state and the second damper state. In addition, for example, it is assumed that in the first damper state and the second damper state, the position of the second damper component 32 with respect to the first damper component 31 is changed in the final state of the movement of the second damper component 32 with respect to the first damper component 31 in the first direction X1. In this case, in the vehicle 100 in a rolling state, the inclination of the vehicle body 101 in the lateral direction differs between the first damper state and the second damper state. In such a manner, by changing the position of the second damper component 32 with respect to the first damper component 31, switching is performed between the first damper state and the second damper state according to, for example, the inclination of a road surface on which the vehicle 100 travels or is stopped, so that the inclination of the vehicle body 101 in the lateral direction can be changed. Accordingly, the comfort of the vehicle 100 is improved.

Modification Example

Figure 6:
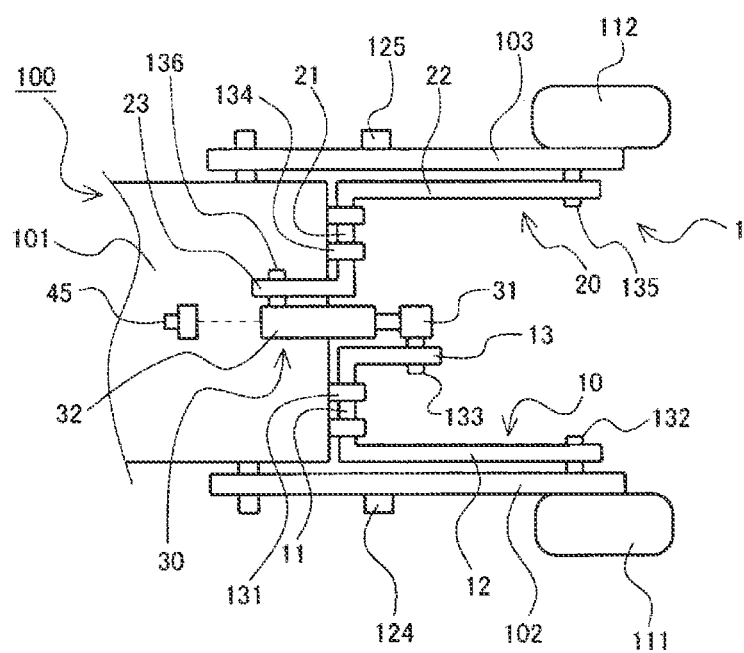
FIG. 6 is a view showing a modification example of the roll control system according to the first embodiment of the invention, and is a view showing a state where the roll control system is mounted to the vehicle, when observed in the line of sight from above the vehicle.

FIG. 6 is a view showing a modification example of the roll control system according to the first embodiment of the invention, and is a view showing a state where the roll control system is mounted to the vehicle, when observed in the line of sight from above the vehicle.

The roll control system 1 described with reference to FIGS. 1 to 5 is configured to switch between the first damper state and the second damper state through the control device 40. However, the control device 40 is not an essential configuration of the roll control system 1. For example, as shown in FIG. 6, the roll control system 1 may include a switching operation unit 45 that receives a manual switching operation between the first damper state and the second damper state. Then, the roll control system 1 may switch between the first damper state and the second damper state when a driver of the vehicle 100 or the like manually operates the switching operation unit 45. In the roll control system 1 with such a configuration as well, the above-described effects can be obtained by performing switching between the first damper state and the second damper state. Incidentally, the configuration of the switching operation unit 45 is not particularly limited. For example, a switch that switches between the first damper state and the second damper state using a mechanical configuration may be used as the switching operation unit 45. In addition, for example, a switch such as a capacitive switch provided on a touch panel or the like may be used as the switching operation unit 45.

Figure 7:
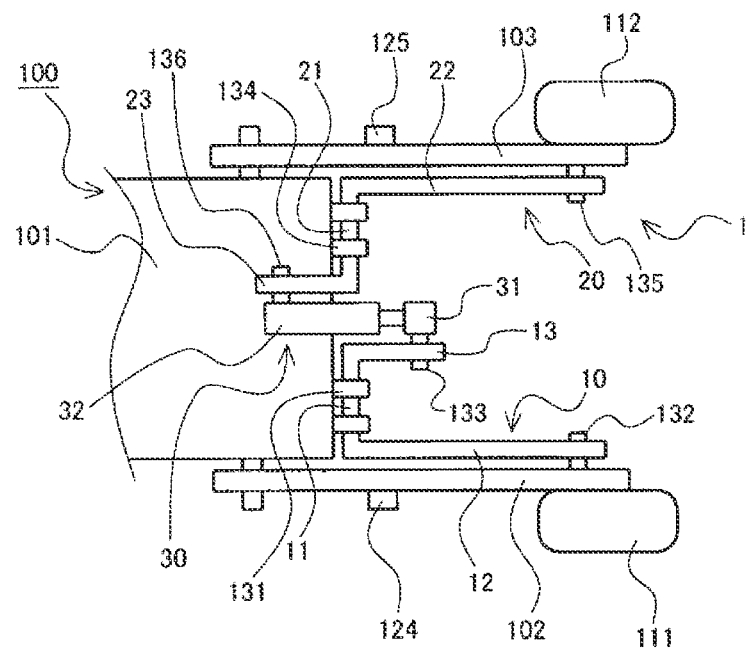
FIG. 7 is a view showing another modification example of the roll control system according to the first embodiment of the invention, and is a view showing a state where the roll control system is mounted to the vehicle, when observed in the line of sight from above the vehicle.

FIG. 7 is a view showing another modification example of the roll control system according to the first embodiment of the invention, and is a view showing a state where the roll control system is mounted to the vehicle, when observed in the line of sight from above the vehicle.

Similarly to the control device 40, the switching operation unit 45 shown in FIG. 6 is also not an essential configuration of the roll control system 1. For example, as shown in FIG. 7, the roll control system 1 may not include the control device 40 and the switching operation unit 45. In the damper 30 of the roll control system 1 with such a configuration, a damping force when extending and a damping force when contracting are set to be different from each other in advance. In other words, in the damper 30 of the roll control system 1 shown in FIG. 7, the damping force when extending and the damping force when contracting are different from each other. In the roll control system 1 with such a configuration, a rigidity of the roll control system 1 when the vehicle 100 rolls and a rigidity of the roll control system 1 when the vehicle body 101 of the vehicle 100 in rolling returns to a horizontal state can be made different. Therefore, the roll control system 1 with such a configuration can also become a roll control system with improved versatility compared to the related art.

<Effects of Roll Control System 1>

Effects of the roll control system according to the first embodiment will be described.

The roll control system 1 according to the first embodiment is a roll control system that controls the roll behavior of the vehicle 100 including the right and left wheels. The roll control system 1 includes the first component 10 connected to the right connecting device 102 that connects the vehicle body 101 of the vehicle 100 and the right wheel 111; the second component 20 connected to the left connecting device 103 that connects the vehicle body 101 and the left wheel 112; and the damper 30 connected to the first component 10 and the second component 20. The damper 30 includes the first damper component 31 and the second damper component 32 reciprocatably connected to the first damper component 31. The first component 10 includes the first base portion 11 rotatably held by the vehicle body 101; the first wheel-side arm portion 12 extending from the first base portion 11 and rotatably connected to the right connecting device 102; and the first damper-side arm portion 13 extending from the first base portion 11 and rotatably connected to the first damper component 31. The second component 20 includes the second base portion 21 rotatably held by the vehicle body 101; the second wheel-side arm portion 22 extending from the second base portion 21 and rotatably connected to the left connecting device 103; and the second damper-side arm portion 23 extending from the second base portion 21 and rotatably connected to the second damper component 32.

The roll control system 1 configured in such a manner can become a roll control system with improved versatility compared to the related art, by changing the characteristics of the damper 30.

Preferably, the vehicle 100 is an off-road vehicle. In many cases, the off-road vehicle may travel not only on a flat road surface but also on a road surface with large unevenness. For this reason, the roll control system mounted to the off-road vehicle requires a further improvement in versatility compared to a roll control system mounted to an on-road vehicle. For this reason, it is preferable that the roll control system 1 according to the first embodiment is mounted to the off-road vehicle.

In the roll control system 1 shown in the first embodiment, the damper 30 is configured to contract as the roll angle of the vehicle 100 increases. The invention is not limited to the configuration, and as shown in a second embodiment, in the roll control system 1, the damper 30 may be configured to extend as the roll angle of the vehicle 100 increases. Incidentally, items that are not described in the second embodiment are the same as those in the first embodiment.

Figure 8:
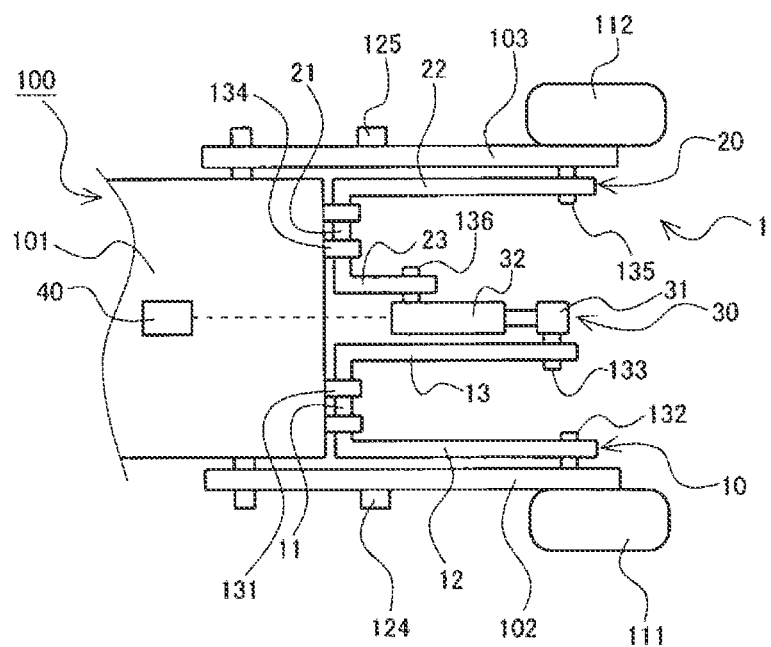
FIG. 8 is a view showing a state where a roll control system according to a second embodiment of the invention is mounted to the vehicle, when observed in the line of sight from above the vehicle.
Figure 9:
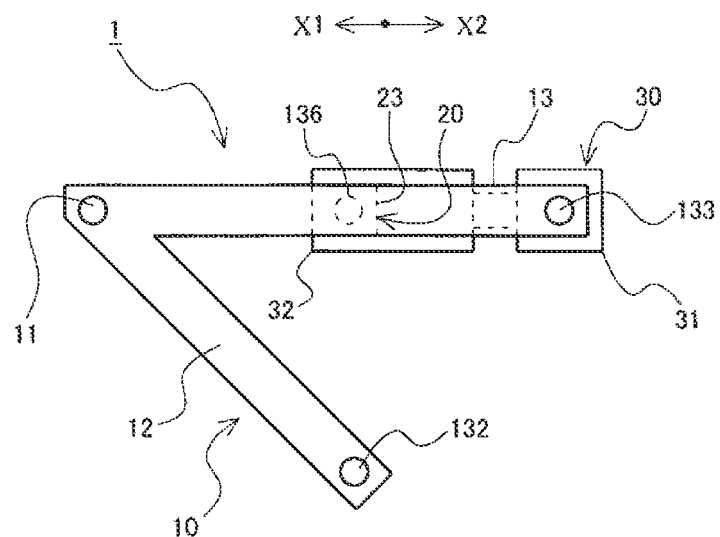
FIG. 9 is a view showing the roll control system according to the second embodiment of the invention, and is a view showing a state where the roll control system is mounted to the vehicle, when observed in the line of sight from the right side of the vehicle.
Figure 10:
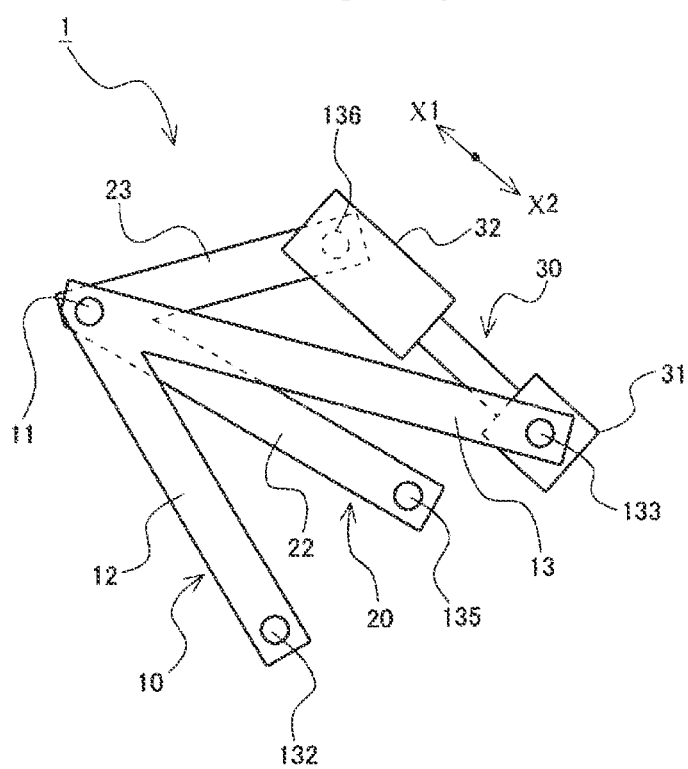
FIG. 10 is a view showing the roll control system according to the second embodiment of the invention, and is a view showing a state where the roll control system is mounted to the vehicle, when observed in the line of sight from the right side of the vehicle.

FIG. 8 is a view showing a state where the roll control system according to the second embodiment of the invention is mounted to the vehicle, when observed in the line of sight from above the vehicle. Incidentally, in FIG. 8, the right side of the drawing sheet is the front side of the vehicle 100. In addition, FIGS. 9 and 10 are views showing the roll control system according to the second embodiment of the invention, and are views showing a state where the roll control system is mounted to the vehicle, when observed in the line of sight from the right side of the vehicle. In other words, FIGS. 9 and 10 are views of the roll control system 1 according to the second embodiment when observed from the lower side of the drawing sheet of FIG. 8. Here, FIG. 9 shows the roll control system 1 in a state where the vehicle 100 is not rolling. In addition, FIG. 10 shows the roll control system 1 in a state where the vehicle 100 is rolling to the left side.

Incidentally, in FIGS. 9 and 10, the second base portion 21 of the second component 20 and the first base portion 11 of the first component 10 overlap each other, and only the first base portion 11 is shown. Therefore, when referring to FIGS. 9 and 10, it is desirable to recognize that the position of the second base portion 21 is the same as the position of the first base portion 11. In addition, in FIG. 9, the second wheel-side arm portion 22 of the second component 20 and the first wheel-side arm portion 12 of the first component 10 overlap each other, and only the first wheel-side arm portion 12 is shown. Therefore, when referring to FIG. 9, it is desirable to recognize that the position of the second wheel-side arm portion 22 is the same as the position of the first wheel-side arm portion 12. In addition, in FIG. 9, the connecting portion 135 that connects the second wheel-side arm portion 22 and the left connecting device 103 overlaps the connecting portion 132 that connects the first wheel-side arm portion 12 and the right connecting device 102. For this reason, in FIG. 9, only the connecting portion 132 is shown. Therefore, when referring to FIG. 9, it is desirable to recognize that the position of the connecting portion 135 is the same as the position of the connecting portion 132.

When observed in the line of sight from the side of the vehicle 100, as shown in FIG. 9, in the roll control system 1 according to the second embodiment, in a state where the vehicle 100 is not rolling, the first damper-side arm portion 13 of the first component 10 and the second damper-side arm portion 23 of the second component 20 extend in substantially the same direction with respect to the first base portion 11 and the second base portion 21. Then, the first damper-side arm portion 13 and the second damper-side arm portion 23 are disposed to overlap the damper 30. Incidentally, in the second embodiment, the first damper-side arm portion 13 is configured to be longer than the second damper-side arm portion 23. The invention is not limited to the configuration, and the second damper-side arm portion 23 may be configured to be longer than the first damper-side arm portion 13.

When the vehicle 100 rolls to the left side, the right wheel 111 moves away from the vehicle body 101. Namely, the connecting portion 132 that connects the first wheel-side arm portion 12 of the first component 10 and the right connecting device 102 also moves away from the vehicle body 101. Accordingly, the first component 10 rotates about the first base portion 11 as the center of rotation, and changes from the state shown in FIG. 9 to the state shown in FIG. 10. Specifically, the first wheel-side arm portion 12 of the first component 10 rotates about the first base portion 11 as the center of rotation in the direction in which the connecting portion 132 moves away from the vehicle body 101 (downward direction in FIG. 10). In addition, the first damper-side arm portion 13 of the first component 10 rotates about the first base portion 11 as the center of rotation in the direction in which the connecting portion 133 that connects the first damper-side arm portion 13 and the first damper component 31 moves away from the second damper component 32.

On the other hand, when the vehicle 100 rolls to the left side, the left wheel 112 approaches the vehicle body 101. Namely, the connecting portion 135 that connects the second wheel-side arm portion 22 of the second component 20 and the left connecting device 103 also approaches the vehicle body 101. Accordingly, the second component 20 rotates about the second base portion 21 as the center of rotation, and changes from the state shown in FIG. 9 to the state shown in FIG. 10. Specifically, the second wheel-side arm portion 22 of the second component 20 rotates about the second base portion 21 as the center of rotation in the direction in which the connecting portion 135 approaches the vehicle body 101 (upward direction in FIG. 10). In addition, the second damper-side arm portion 23 of the second component 20 rotates about the second base portion 21 as the center of rotation in the direction in which the connecting portion 136 that connects the second damper-side arm portion 23 and the second damper component 32 moves away from the first damper component 31.

Namely, in the roll control system 1 according to the second embodiment, the damper 30 is configured to extend as the roll angle of the vehicle 100 to the left side increases. In addition, in the roll control system 1 configured in such a manner, the damper 30 is configured to contract as the roll angle of the vehicle 100 to the left side decreases. Then, in the roll control system 1 configured in such a manner, when the vehicle 100 is not rolling, the damper 30 is in a maximum contracted state. When the vehicle 100 rolls to the right side, the damper 30 also moves similarly.

Specifically, when the vehicle 100 rolls to the right side, the right wheel 111 approaches the vehicle body 101. Namely, the connecting portion 132 that connects the first wheel-side arm portion 12 of the first component 10 and the right connecting device 102 also approaches the vehicle body 101. Accordingly, the first wheel-side arm portion 12 of the first component 10 rotates about the first base portion 11 as the center of rotation in the direction in which the connecting portion 132 approaches the vehicle body 101. In addition, the first damper-side arm portion 13 of the first component 10 rotates about the first base portion 11 as the center of rotation in the direction in which the connecting portion 133 that connects the first damper-side arm portion 13 and the first damper component 31 moves away from the second damper component 32.

On the other hand, when the vehicle 100 rolls to the right side, the left wheel 112 moves away from the vehicle body 101. Namely, the connecting portion 135 that connects the second wheel-side arm portion 22 of the second component 20 and the left connecting device 103 also moves away from the vehicle body 101. Accordingly, the second wheel-side arm portion 22 of the second component 20 rotates about the second base portion 21 as the center of rotation in the direction in which the connecting portion 135 moves away from the vehicle body 101. In addition, the second damper-side arm portion 23 of the second component 20 rotates about the second base portion 21 as the center of rotation in the direction in which the connecting portion 136 that connects the second damper-side arm portion 23 and the second damper component 32 moves away from the first damper component 31.

In such a manner, in the roll control system 1 according to the second embodiment, the damper 30 is configured to extend as the roll angle of the vehicle 100 to the right side increases. In addition, in the roll control system 1 configured in such a manner, the damper 30 is configured to contract as the roll angle of the vehicle 100 to the right side decreases. Namely, in the roll control system 1 according to the second embodiment, the damper 30 is configured to extend as the roll angle of the vehicle 100 increases.

Similarly to the roll control system 1 shown in the first embodiment, the roll control system 1 configured in such a manner can also become a roll control system with improved versatility compared to the related art, by changing the characteristics of the damper 30.

Incidentally, the roll control system 1 shown in the first embodiment and the roll control system 1 according to the second embodiment can obtain different effects as shown below.

When the first component 10 and the second component 20 rotate and the damper 30 attempts to extend and contract, reaction forces of substantially the same magnitude from the damper 30 act on the first component 10 and the second component 20. Here, as shown in FIG. 3, in the roll control system 1 shown in the first embodiment, the first damper-side arm portion 13 of the first component 10 and the second damper-side arm portion 23 of the second component 20 extend in substantially the opposite directions. Therefore, in the roll control system 1 shown in the first embodiment, the first damper-side arm portion 13 and the second damper-side arm portion 23 can be made substantially the same length. For this reason, in the roll control system 1 shown in the first embodiment, the rotational moment generated by the reaction force from the damper 30 is substantially the same between the first component 10 and the second component 20. Therefore, in the roll control system 1 shown in the first embodiment, the degree of restriction to the up and down movement of the right wheel 111 by the roll control system 1 and the degree of restriction to the up and down movement of the left wheel 112 by the roll control system 1 can be made substantially the same. For this reason, by adopting the roll control system 1 shown in the first embodiment for a vehicle in which a heavy object such as an engine can be disposed in the vicinity of substantially the center in a left-right direction, roll behaviors of the vehicle in the left-right direction can be made substantially the same, so that the comfort of the vehicle is improved.

On the other hand, as shown in FIG. 9, in the roll control system 1 according to the second embodiment, the first damper-side arm portion 13 of the first component 10 and the second damper-side arm portion 23 of the second component 20 extend in substantially the same direction. Therefore, in the roll control system 1 according to the second embodiment, the lengths of the first damper-side arm portion 13 and the second damper-side arm portion 23 are different from each other. Hereinafter, of the first damper-side arm portion 13 and the second damper-side arm portion 23, the longer damper-side arm portion is referred to as a long-side arm portion. For this reason, in the roll control system 1 according to the second embodiment, the rotational moment generated by the reaction force from the damper 30 differs between the first component 10 and the second component 20. Specifically, of the first component 10 and the second component 20, the rotational moment generated in the component including the long-side arm portion increases. Hereinafter, of the first component 10 and the second component 20, the component including the long-side arm portion is referred to as a long-side arm portion-equipped component. Therefore, in the roll control system 1 according to the second embodiment, of the right wheel 111 and the left wheel 112, the up and down movement of the wheel connected to the long-side arm portion-equipped component is greatly restricted.

Among vehicles of the related art, there is a vehicle such as a crane truck in which one side in the left-right direction is heavier than the other side in the left-right direction. Hereinafter, such a vehicle is referred to as a left-right weight unbalanced vehicle. The left-right weight unbalanced vehicle of the related art includes a connecting device that does not cause excessive rolling on a heavy side in the left-right direction, as a connecting device that connects a vehicle body and a wheel disposed on the heavy side. In addition, the left-right weight unbalanced vehicle of the related art adopts the same connecting device that connects the vehicle body and the wheel disposed on the heavy side, as a connecting device that connects the vehicle body and a wheel disposed on a light side in the left-right direction. For this reason, in the left-right weight unbalanced vehicle of the related art, rolling on the light side in the left-right direction is excessively suppressed. Therefore, the left-right weight unbalanced vehicle of the related art is reduced in comfort. On the other hand, the above-described problem can be solved by mounting the roll control system 1 according to the second embodiment to the left-right weight unbalanced vehicle. Specifically, the long-side arm portion-equipped component may be connected to the wheel disposed on the heavy side in the left-right direction. Accordingly, the left-right weight unbalanced vehicle to which the roll control system 1 according to the second embodiment is mounted can suppress the occurrence of excessive rolling on the heavy side in the left-right direction, and can also reduce excessive suppression of rolling on the light side in the left-right direction. For this reason, the left-right weight unbalanced vehicle to which the roll control system 1 according to the second embodiment is mounted is improved in comfort.

One example of the roll control system according to the invention has been described above in each embodiment, however, the roll control system according to the invention is not limited to the description of the embodiments. For example, only a part of the description of each embodiment may be implemented in the roll control system according to the invention.

What is claimed is:

1. A roll control system that controls a roll behavior of a vehicle including right and left wheels, the system comprising:
   a first component connected to a right connecting device that connects a vehicle body of the vehicle and a right wheel;
   a second component connected to a left connecting device that connects the vehicle body and a left wheel;
   a damper connected to the first component and the second component; and
   a control device,
   wherein the damper includes a first damper component and a second damper component reciprocatably connected to the first damper component,
   the first component includes a first base portion rotatably held by the vehicle body, a first wheel-side arm portion extending from the first base portion and rotatably connected to the right connecting device, and a first damper-side arm portion extending from the first base portion and rotatably connected to the first damper component,
   the second component includes a second base portion rotatably held by the vehicle body, a second wheel-side arm portion extending from the second base portion and rotatably connected to the left connecting device, and a second damper-side arm portion extending from the second base portion and rotatably connected to the second damper component,
   wherein the control device switches between a first damper state where a movement of the second damper component with respect to the first damper component in a first direction is in a first state and a second damper state where the movement is in a second state different from the first state.

2. The roll control system according to claim 1, wherein the damper is configured to contract as a roll angle of the vehicle increases.

3. The roll control system according to claim 1,
wherein the damper is configured to extend as a roll angle of the vehicle increases.

4. The roll control system according to claim 1,
wherein the control device includes an acquisition unit that acquires vehicle speed information of the vehicle, and is configured to switch between the first state and the second state according to a value of the vehicle speed information.

5. The roll control system according to claim 1,
wherein the control device includes an acquisition unit that acquires roll information of the vehicle, and is configured to switch between the first state and the second state according to a value of the roll information.

6. The roll control system according to claim 1,
wherein the control device includes an acquisition unit that acquires steering angle information of the vehicle, and is configured to switch between the first state and the second state according to a value of the steering angle information.

7. The roll control system according to claim 1,
wherein the control device is configured to switch between the first state and the second state according to a distance between the vehicle body and the right wheel and a distance between the vehicle body and the left wheel.

8. The roll control system according to claim 1,
wherein a movement of the second damper component with respect to the first damper component in a second direction opposite to the first direction is unchanged between the first damper state and the second damper state.

9. The roll control system according to claim 1,
wherein the control device changes a damping force between the first damper state and the second damper state.

10. The roll control system according to claim 1,
wherein the control device changes a position of the second damper component with respect to the first damper component in at least one of an initial state and a final state of the movement in the first direction in the first damper state and the second damper state.

11. The roll control system according to claim 1,
wherein a damping force of the damper when extending and a damping force of the damper when contracting are different from each other.

12. A vehicle comprising:
a roll control system that controls a roll behavior of a vehicle including right and left wheels, the roll control system including:
a first component connected to a right connecting device that connects a vehicle body of the vehicle and a right wheel;
a second component connected to a left connecting device that connects the vehicle body and a left wheel;
a damper connected to the first component and the second component; and
a switching operation unit,
wherein the damper includes a first damper component and a second damper component reciprocatably connected to the first damper component,
the first component includes a first base portion rotatably held by the vehicle body, a first wheel-side arm portion extending from the first base portion and rotatably connected to the right connecting device, and a first damper-side arm portion extending from the first base portion and rotatably connected to the first damper component,
the second component includes a second base portion rotatably held by the vehicle body, a second wheel-side arm portion extending from the second base portion and rotatably connected to the left connecting device, and a second damper-side arm portion extending from the second base portion and rotatably connected to the second damper component, and
the switching operation unit receives a manual switching operation between a first damper state where a movement of the second damper component with respect to the first damper component in a first direction is in a first state and a second damper state where the movement is in a second state different from the first state.

13. The vehicle according to claim 12,
wherein the vehicle is an off-road vehicle.

14. A roll control system that controls a roll behavior of a vehicle including right and left wheels, the system comprising:
a first component connected to a right connecting device that connects a vehicle body of the vehicle and a right wheel;
a second component connected to a left connecting device that connects the vehicle body and a left wheel; and
a damper connected to the first component and the second component,
wherein the damper includes a first damper component and a second damper component reciprocatably connected to the first damper component,
the first component includes a first base portion rotatably held by the vehicle body, a first wheel-side arm portion extending from the first base portion and rotatably connected to the right connecting device, and a first damper-side arm portion extending from the first base portion and rotatably connected to the first damper component,
the second component includes a second base portion rotatably held by the vehicle body, a second wheel-side arm portion extending from the second base portion and rotatably connected to the left connecting device, and a second damper-side arm portion extending from the second base portion and rotatably connected to the second damper component,
wherein a damping force of the damper when extending and a damping force of the damper when contracting are different from each other.

* * * * *